Patented Oct. 9, 1951

2,570,181

UNITED STATES PATENT OFFICE 2,570,181

DIETHYLAMINOETHYL ALKOXY-BENZILATES

Earl R. Bockstahler, Indianapolis, Ind., assignor to Allied Laboratories, Inc., Kansas City, Mo., a corporation of Delaware No Drawing. Application April 15, 1949,
Serial No. 87,847

7 Claims. (Cl. 260—473)

The present invention relates to a new class of organic compounds and more particularly to diethylaminoethyl alkoxybenzilates, salts thereof and to processes of making them.

The new compounds of my invention comprise those represented by the following structural formula and acid addition salts thereof:

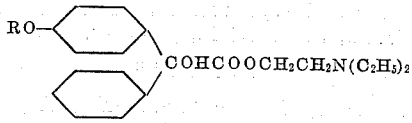

in which R is an alkyl group having from one to ten carbon atoms.

In general the new compound of this invention may be prepared from appropriately substituted desoxybenzoins by the following route:

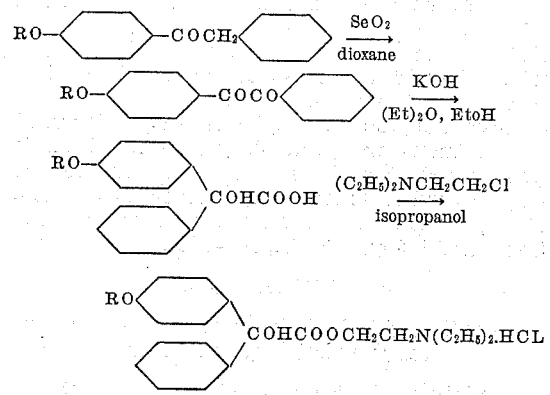

The bases are obtained by treating the HCl salt with an alkali and when desired other acid addition salts can be prepared from the bases.

The diethylaminoethyl alkoxybenzilates and acid addition salts of this invention have been found to have a very desirable local anesthetic action.

The following specific examples illustrate the preparation of the new compounds.

Many of the intermediate compounds employed in preparing the compounds of the present invention are new and hence a suitable method for their preparation is illustrated by giving specific instructions for preparing p-n-hexyloxyphenyl benzyl ketone, p-n-hexyloxybenzil and dl-p-n-hexyloxybenzilic acid respectively. The new alkoxyphenyl benzyl ketones, p-alkoxybenzils and p-alkoxybenzilic acids and methods of preparation are claimed in the co-pending applications, Serial Number 103,948, filing date July 9, 1949, Serial Number 103,949, filing date July 9, 1949, and Serial Number 103,950, now abandoned, filing date, July 9, 1949, respectively.

By substituting the appropriate alkyl bromide for n-hexyl bromide in the following intermediate preparation instructions, the other necessary intermediates are obtained. The alkyl bromides thus employed are ethyl bromide, n-propyl bromide, isopropyl bromide, n-butyl bromide, isobutyl bromide, n-amyl bromide, isoamyl bromide, n-heptyl bromide, n-octyl bromide and n-decyl bromide respectively.

*Preparation of the intermediate p-n-hexyloxyphenyl benzyl ketone*

A mixture of 49.5 gm. of n-hexyl bromide, 63.6 gm. of p-phenylacetylphenol, 41.4 gm. of potassium carbonate and enough acetone to cover the solids was boiled under reflux for twenty-four hours. Five per cent aqueous sodium hydroxide solution was then added, with stirring, until no more solid appeared to dissolve, and the mixture was filtered. The solid obtained was washed with water, then recrystallized from methanol. Yield, 57 gm.; M. P. 75.5–77°.

*Preparation of the intermediate p-n-hexyloxybenzil*

A mixture of 1397 gm. of p-n-hexyloxyphenyl benzyl ketone, 548 gm. of selenium dioxide, 88 cc. of water and 2500 cc. of dioxane was refluxed for twelve hours. After removal of selenium by filtration and dioxane by distillation under reduced pressure, the residue solidified on cooling. It was recrystallized from 95% ethanol. Yield, 1423 gm.; M. P. 45–49°.

*Preparation of the intermediate dl-p-n-hexyloxybenzilic acid*

A solution of 77 gm. of p-n-hexyloxybenzil in 800 cc. of ether was mixed with a solution of 19.8 g. of potassium hydroxide in 160 cc. of 95% ethanol and allowed to stand for twenty-four hours with occasional shaking. The mixture was then shaken with 400 cc. of water. The water layer was separated, filtered and acidified with hydrochloric acid. After long standing at room temperature, the oil which precipitated solidified. Recrystallization from petroleum ether gave a crystalline product which melted at 62–64°.

EXAMPLE 1

*Preparation of 2-diethylaminoethyl dl-p-methoxybenzilate HCl*

Ten grams of dl-p-methoxybenzilic acid, 5.2 g. of diethylaminoethyl chloride and 50 cc. of anhydrous isopropanol were mixed and boiled under reflux for six and one-half hours. The solid 2-diethylaminoethyl dl-p-methoxybenzilate HCl which separated on cooling was recrystallized from isopropanol, and weighed 10 grams. The recrystalized material had a melting point of 168–70° C. and the analysis was satisfactory.

EXAMPLE 2

*Preparation of 2-diethylaminoethyl dl-p-n-hexyloxybenzilate hydrochloride*

A mixture of 5 gm. of dl-p-n-hexyloxybenzilic acid, 2.1 gm. of freshly distilled 2-diethylaminoethyl chloride and 10 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in 5 cc. of methanol, and isopropyl ether was added until a permanent precipitate began to form. This was filtered off and discarded. The filtrate was diluted further with isopropyl ether and chilled. The solid which separated was removed by filtration. Yield, 5 gm.; M. P. 123–5°.

EXAMPLE 3

*Preparation of 2-diethylaminoethyl dl-p-ethoxybenzilate hydrochloride*

A mixture of 4.2 gm. of dl-p-ethoxybenzilic acid, 2.1 gm. of freshly distilled 2-diethylaminoethyl chloride and 25 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 5 gm.; M. P. 172–173°.

EXAMPLE 4

*Preparation of 2-diethylaminoethyl dl-p-n-propoxybenzilate hydrochloride*

A mixture of 8 gm. of dl-p-n-propoxybenzilic acid, 4 gm. of freshly distilled 2-diethylaminoethyl chloride and 25 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 8 gm.; M. P., 140–142°.

EXAMPLE 5

*Preparation of 2-diethylaminoethyl dl-p-isopropoxybenzilate hydrochloride*

A mixture of 5 gm. of dl-p-isopropoxybenzilic acid, 2.4 gm. of freshly distilled 2-diethylaminoethyl chloride and 20 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 6 gm.; M. P., 161–162°.

EXAMPLE 6

*Preparation of 2-diethylaminoethyl dl-p-n-butoxybenzilate hydrochloride*

A mixture of 7 gm. of dl-p-n-butoxybenzilic acid, 3.2 gm. of freshly distilled 2-diethylaminoethyl chloride and 25 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 7 gm.; M. P., 141–143°.

EXAMPLE 7

*Preparation of 2-diethylaminoethyl dl-p-isobutoxybenzilate hydrochloride*

A mixture of 3 gm. of dl-p-isobutoxybenzilic acid, 1.4 gm. of freshly distilled 2-diethylaminoethyl chloride and 15 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 3 gm.; M. P., 140–142°.

EXAMPLE 8

*Preparation of 2-diethylaminoethyl dl-p-sec-butoxybenzilate hydrochloride*

A mixture of 6.2 gm. crude dl-p-sec-butoxybenzilic acid, 2.8 gm. of freshly distilled 2-diethylaminoethyl chloride and 25 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 6 gm. M. P., 154–156°.

EXAMPLE 9

*Preparation of 2-diethylaminoethyl dl-p-n-amoxybenzilate hydrochloride*

A mixture of 7.5 gm. dl-p-n-amoxybenzilic acid, 3.2 gm. of freshly distilled 2-diethylaminoethyl chloride and 15 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 8.5 gm.; M. P. 135–136°.

EXAMPLE 10

*Preparation of 2-diethylaminoethyl dl-p-isoamoxybenzilate hydrochloride*

A mixture of 15 gm. of dl-p-isoamoxybenzilic acid, 6.5 gm. of freshly distilled 2-diethylaminoethyl chloride and 25 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 8 gm.; M. P., 133–135°.

EXAMPLE 11

*Preparation of 2-diethylaminoethyl dl-p-n-heptyloxybenzilate hydrochloride*

A mixture of 15 gm. of dl-p-n-heptyloxybenzilic acid, 6 gm. of freshly distilled 2-diethylaminoethyl chloride and 25 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 14 gm.; M. P., 130–132°.

EXAMPLE 12

*Preparation of 2-diethylaminoethyl dl-p-n-octyloxybenzilate hydrochloride*

A mixture of 3 gm. of dl-p-n-octyloxybenzilic acid, 1.2 gm. of freshly distilled 2-diethylaminoethyl chloride and 25 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 2.3 gm.; M. P. 126–127°.

EXAMPLE 13

*Preparation of 2-diethylaminoethyl dl-p-n-decyloxybenzilate hydrochloride*

A mixture of 10 gm. of dl-p-n-decyloxybenzilic acid, 3.6 gm. of freshly distilled 2-diethylaminoethyl chloride and 35 cc. anhydrous isopropanol was boiled under reflux for twelve hours, then cooled to room temperature. Isopropyl ether was added until a permanent turbidity was produced, and the solution was chilled to 0–5° C. The solid which formed was removed by filtration. For purification, it was redissolved in a small amount of methanol, and isopropyl ether was added until a permanent precipitate began to form. This was filtered off and discarded. The filtrate was diluted further with isopropyl ether and chilled. The solid which separated was removed by filtration. Yield, 10 gm.; M. P. 124–125°.

EXAMPLE 14

*Preparation of 2-diethylaminoethyl dl-p-n-hexyloxybenzilate*

A saturated solution of 2-diethylaminoethyl dl-p-n-hexyloxybenzilate hydrochloride in water was made alkaline by the addition of ammonium hydroxide, which caused separation of an oily layer. The mixture was extracted with ether, which dissolved the oil. The ether extract was dried over sodium sulfate, and the ether then evaporated off under reduced pressure, leaving a residual oil which was 2-diethylaminoethyl dl-p-n-hexyloxybenzilate.

EXAMPLE 15

*Preparation of 2-diethylaminoethyl dl-p-n-hexyloxybenzilate sulfate*

Five grams of 2-diethylaminoethyl dl-p-n-hexyloxybenzilate was suspended in 20 cc. of water, and 10% aqueous sulfuric acid was added gradually until a clear solution, slightly acid in reaction, was obtained. This was placed in a desiccator over concentrated sulfuric acid and left until no further decrease in volume occurred. The sticky, viscous residue obtained was triturated with isopropyl ether, which caused it to solidify. The solid was recrystallized from a mixture of methanol and isopropyl ether, to give the desired sulfate as a white powder.

EXAMPLE 16

*Preparation of 2-diethylaminoethyl dl-p-n-hexyloxybenzilate citrate*

Three grams of 2-diethylaminoethyl dl-p-n-hexyloxybenzilate were mixed with 1.5 gm. of citric acid, and enough water added to give a clear solution. This was allowed to stand over concentrated sulfuric acid in a desiccator until there was no further decrease in volume. The sticky, viscous residue was triturated with isopropyl ether, and the resulting solid was recrystallized from a mixture of methanol and isopropyl ether to give the desired citrate as a white powder.

The local anesthetic activities of my new diethylaminoethyl alkoxybenzilates were determined by using the rabbit's cornea test. The local anesthetic activity and the acute toxicities are shown in the following table.

The MAC (minimum anesthetic concentration) recorded in the table is the minimum concentration of the compound being tested which sufficed to abolish the wink response to pressure from a bead-ended glass rod. The MNIC (maximum non-irritant concentration) is the greatest concentration which did not produce any visible sign of irriation—pitting, hyperemia, or edema of cornea or conjunctivae—during the experiment or subsequently. The median lethal dose is indicated in the table by $LD_{50}$ as determined by (i. p.) intraperitoneal injections in mice.

Enhancement of local anesthetic activity by appropriate alkoxy substitution is clearly apparent. A maximum was reached with the n-hexyloxy derivative, which produced anesthesia of twenty to thirty minutes duration when applied in 0.01% concentration. At a concentration of 0.25%, which caused temporary irritation (complete recovery by the following day), the duration of anesthesia was approximately three hours.

TABLE

[Toxicity and Local Anesthetic Activity of 2-diethylaminoethyl alkoxybenzilate HCl.]

$$\begin{array}{c}ROC_6H_5\\ \diagdown\\ COHCOOCH_2CH_2N(C_2H_5)_2HCl\\ \diagup\\ C_6H_5\end{array}$$

| R | $LD_{50}$ Mice, i. p., mg./kg. | Local anesthesia | |
|---|---|---|---|
| | | MAC[1] | MNIC[2] |
| 4-CH₃OC₆H₄ | 75 | 0.1 | 0.1 |
| 4-C₂H₅OC₆H₄ | 155 | 0.25 | <0.1 |
| 4-n-C₃H₇OC₆H₄ | 228 | 0.1 | <0.05 |
| 4-iso-C₃H₇OC₆H₄ | 143 | 0.05 | 0.05 |
| 4-n-C₄H₉OC₆H₄ | 256 | 0.1 | <0.05 |
| 4-iso-C₄H₉OC₆H₄ | 136 | 0.05 | 0.05 |
| 4-n-C₅H₁₁OC₆H₄ | [3] 230 | 0.025 | 0.025 |
| 4-iso-C₅H₁₁OC₆H₄ | 176 | 0.025 | 0.05 |
| 4-n-C₆H₁₃OC₆H₄ | 148 | 0.01 | 0.025 |
| 4-n-C₈H₁₇OC₆H₄ | [3] 460 | 0.5 | 0.25 |
| Dibucaine hydrochloride | 22 | 0.01 | 0.025 |

[1] Minimum anesthetic concentration.
[2] Maximum non-irritant concentration.
[3] Because of its low solubility, the compound was administered for toxicity determinations in gum acacia suspension.

It is seen in the table that the compounds of this invention have a high degree of local anesthetic activity and a low toxicity. The therapeutic index based on the minimum non-irritating concentration of local anesthetic activity compared to median lethal toxicity is more favorable than the therapeutic index of Dibucaine, one of them ore active commercial local anesthetics.

What I claim is:

1. A compound of the group consisting of those having the structure:

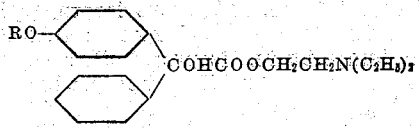

in which R is an alkyl group having from three to seven carbon atoms and acid addition salts thereof.

2. A compound of the group consisting of the one having the structure:

and acid addition salts thereof.

3. A compound of the group consisting of the one having the structure:

and acid addition salts thereof.

4. A compound of the group consisting of the one having the structure:

and said addition salts thereof.

5. The hydrochloride of diethylaminoethyl 4-n-butoxybenzilate.

6. The hydrochloride of diethylaminoethyl 4-n-amoxybenzilate.

7. The hydrochloride of diethylaminoethyl 4-n-hexyloxybenzilate.

EARL R. BOCKSTAHLER.

REFERENCES CITED

The following references are of record in the file of this patent:

UNITED STATES PATENTS

| Number | Name | Date |
|---|---|---|
| 1,932,341 | Guggenheim | Oct. 24, 1933 |
| 2,394,770 | Hill et al. | Feb. 12, 1946 |
| 2,399,736 | Holmes et al. | May 7, 1946 |
| 2,401,219 | Blicke | May 28, 1946 |
| 2,430,116 | Holmes et al. | Nov. 4, 1947 |